(12) United States Patent
Orr

(10) Patent No.: US 6,336,685 B1
(45) Date of Patent: Jan. 8, 2002

(54) EMBEDDED SINGLE BEARING WHEEL

(76) Inventor: Kenneth R. Orr, 3308 Shellbrook Ct., Arlington, TX (US) 76016

( * ) Notice: Subject to any disclaimer, the term of this patent is extended or adjusted under 35 U.S.C. 154(b) by 0 days.

(21) Appl. No.: 09/651,237

(22) Filed: Aug. 30, 2000

Related U.S. Application Data
(60) Provisional application No. 60/161,576, filed on Oct. 26, 1999.

(51) Int. Cl.[7] .............................................. B60B 33/00
(52) U.S. Cl. ................... 301/64.701; 16/46; 16/18 CG; 301/37.101
(58) Field of Search ...................... 301/5.3, 5.7, 37.1, 301/64.7; 16/18 R, 45, 46, 18 CG

(56) References Cited

U.S. PATENT DOCUMENTS

| | | | |
|---|---|---|---|
| 353,644 A | * 11/1886 | Root ........................... | 301/5.7 |
| 1,153,838 A | 9/1915 | Bower et al. | |
| 1,162,145 A | 11/1915 | Dorsch | |
| 1,177,048 A | 3/1916 | Nice | |
| 1,368,465 A | 2/1921 | Sutliffe | |
| 1,482,579 A | 2/1924 | Nice | |
| 1,739,557 A | * 12/1929 | McTigue ........................ | 301/5.7 |
| 1,780,761 A | 11/1930 | Naschke, Jr. | |
| 2,034,948 A | * 3/1936 | Knapp ......................... | 301/5.7 |
| 3,072,169 A | 1/1963 | Hastings, Jr. | |
| 3,400,988 A | * 9/1968 | Hudson et al. ............. | 301/64.7 |
| 4,404,707 A | 9/1983 | Walker .......................... | 16/31 |
| 5,230,571 A | 7/1993 | Estkowski et al. ........... | 384/560 |
| 5,303,449 A | 4/1994 | Gray ............................. | 16/18 |
| 5,443,277 A | * 8/1995 | Kubierschky ................ | 301/5.7 |
| 5,470,086 A | * 11/1995 | Peterson et al. ............. | 301/5.7 |
| 5,667,280 A | * 9/1997 | Hansen ........................ | 301/5.3 |
| 6,142,578 A | * 11/2000 | Pawlowski et al. .......... | 301/5.7 |

FOREIGN PATENT DOCUMENTS

| | | | | |
|---|---|---|---|---|
| JP | 126202 | * | 7/1983 | ................. 301/5.7 |
| JP | 166704 | * | 7/1986 | ................. 301/5.7 |

* cited by examiner

Primary Examiner—S. Joseph Morano
Assistant Examiner—Long Bao Nguyen
(74) Attorney, Agent, or Firm—Guy V. Manning

(57) ABSTRACT

A wheel for small vehicles and similar applications is provided, the wheel having a molded hub concentric about its axis, said hub having a single, precision bushing journaled within the hub concentric about said axis. Two thread guards sandwich the wheel, the guards having shanks which meet in the middle of the bushing and affix the guards to the wheel by friction. The guards may have a variety of axle channel diameters for various applications for the same wheel. The guards include wheel cover shields on their distal extremes which widen the effective diameter of the enclosed bushing and protect it from contamination.

13 Claims, 2 Drawing Sheets

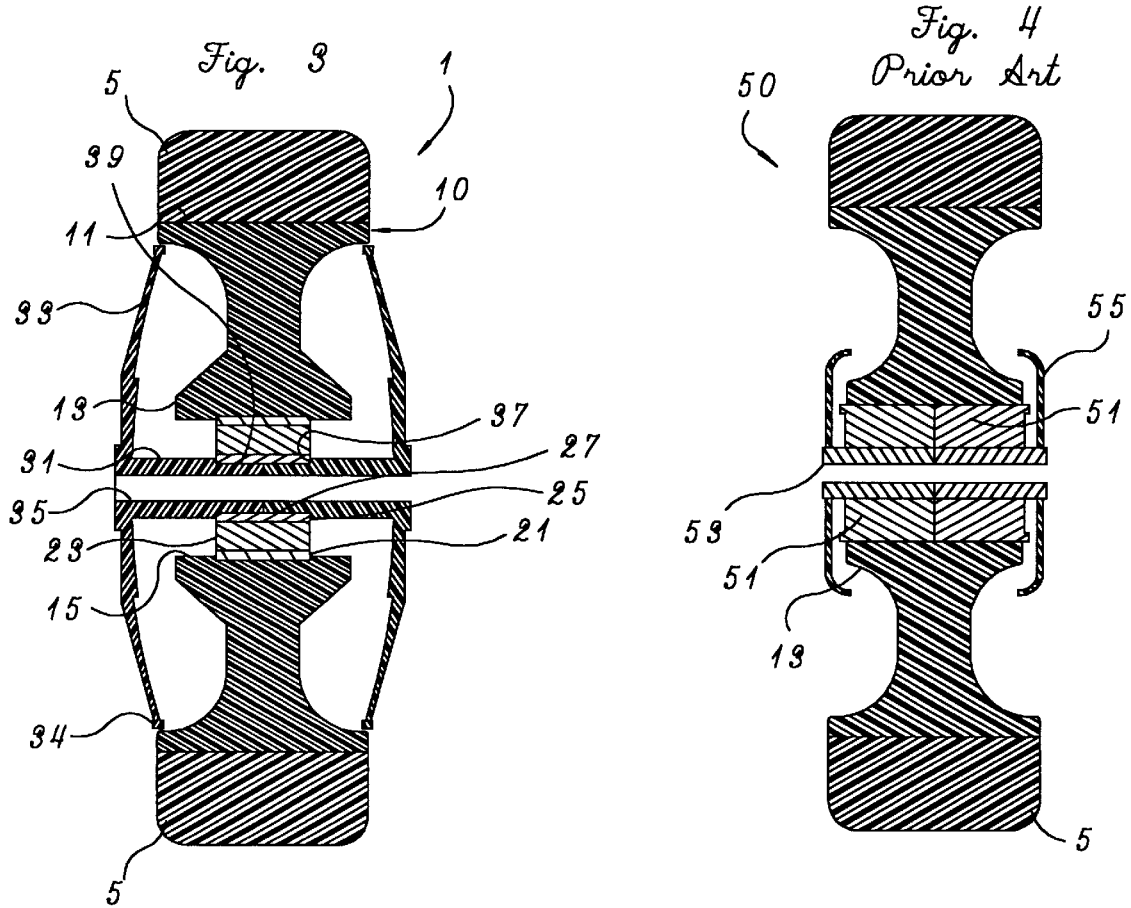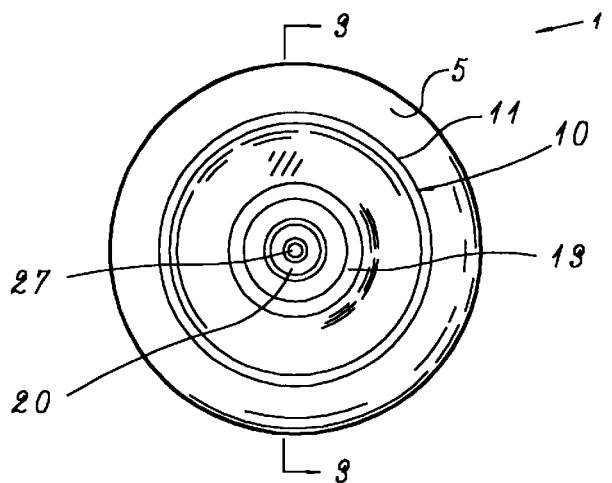

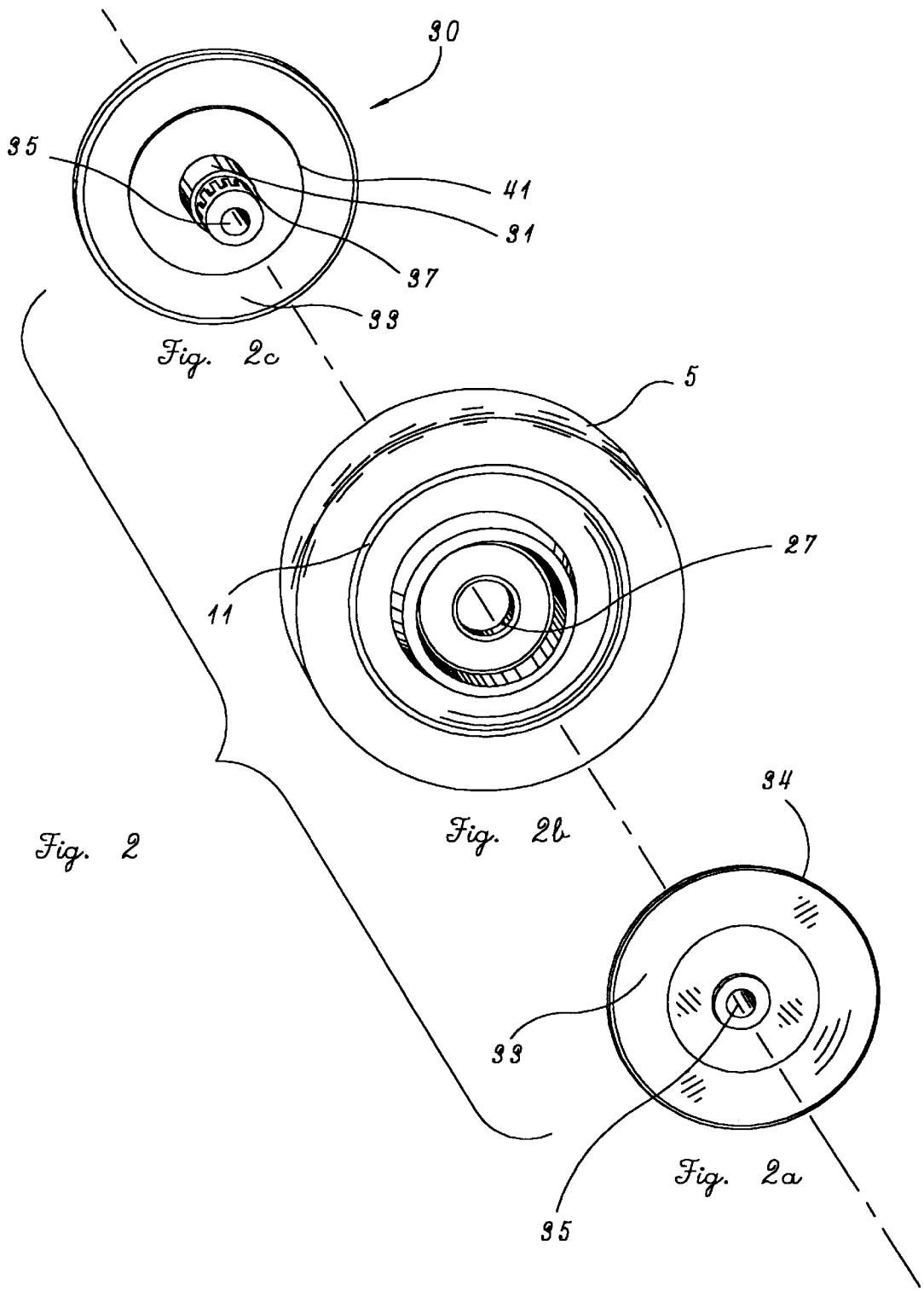

EMBEDDED SINGLE BEARING WHEEL

This application claims priority from a Provisional Application including the same subject matter, Ser. No. 60/161,576, filed Oct. 26, 1999.

BACKGROUND OF THE INVENTION

1. Field of the Invention

This invention relates to small wheels for carts, dollies and the like. More specifically, it relates to wheels having a single bearing substituted for the more common double bearing wheel, the single bearing being embedded within the wheel hub.

2. Description of Related Art

Small wheels are used for various vehicles such as carts and skates and for other applications such as casters and conveyors. Where smooth rotation and longevity of the wheel is desired, such wheels include one or more bushings or bearings which surround the axle inside the hub, the bushings being of high strength and precision. Such bushings often are quite expensive, and cost savings for such applications is always welcome in the marketplace.

For symmetry and lateral balance, small wheels usually employ two bushings, one on each side of the wheel's plane of rotation. By this means, wheel wobble may be discouraged. Where a single bushing has been used successfully in the past, it usually was an oversized bushing extending substantially on either side of the plane of rotation. This is because a narrower bushing may loosen if not supported by other means. Use of two bushings requires additional materials and labor costs, adds weight to the wheel, and sometimes introduces assembly complications such as axle alignment. A need exists for means for employing a smaller, single bushing for cost savings and simplicity.

SUMMARY OF THE INVENTION

Accordingly, it is an object of this invention to provide a wheel employing a single bushing which is economical to fabricate and operate.

It is another object of this invention to provide a single bushing wheel which overcomes the obstacles of wheel wobble, assembly accuracy and weight restrictions.

It is yet another object of this invention to provide small wheel which is esthetically pleasing and attractive.

The foregoing and other objects of this invention are achieved by providing a wheel having a molded hub concentric about its axis, said hub having a single, precision bushing journaled within an aperture concentric about said axis, the bushing having an inner aperture. Two hubcap-style thread guards sandwich the wheel, the guards having shanks which meet in the middle of the bushing and affix the guards to the wheel by friction. The guards may have a variety of axle channel diameters for various application for the same wheel. The guards include wheel cover shields on their distal extremes which widen the effective width of the enclosed bushing, increase its stability and lend an esthetically pleasing appearance to the wheel.

BRIEF DESCRIPTION OF THE DRAWINGS

The novel features believed characteristic of the present invention are set forth in appended claims. The invention itself, however, as well as a preferred mode of use and further objects and advantages thereof, will best be understood by reference to the following detailed description of an illustrative embodiment when read in conjunction with the accompanying drawings, wherein:

FIG. 1 shows an axial view of the wheel of the present invention without a wheel cover in place.

FIG. 2 (FIG. 2a, 2b and 2c) depicts in perspective the wheel of FIG. 1 and showing wheel covers which mate thereto in exploded juxtaposition.

FIG. 3 depicts a cross section of the wheel of the present invention as indicated in FIG. 1, but with the wheel covers in place.

FIG. 4 shows a prior art wheel having dual bushings and protective hubcaps.

DETAILED DESCRIPTION OF A PREFERRED EMBODIMENT

With reference now to the figures, and in particular to FIGS. 1, 2 and 3, wheel 1 having components described below appears symmetric about plane of rotation B and adapted to rotate about axis A. Wheel 1 typically would be used for small vehicles, casters and conveyors.

Wheel 1 comprises rim 10 bearing tire 5 concentric about its outer circumference 11. Within circumference 11, wheel 1 includes body 12 concentric about hub 13. Within hub 13, pocket 15 contains bushing 20, which includes inner race 25 and outer race 21 enclosing a plurality of bearings 23. Bushing 20 is mounted within pocket 15 astraddle wheel 1's plane of rotation B. Hub 13 extends axially wider than bushing 20 to permit inclusion of wider bushings (not shown) than bushing 20.

Bushing 20 is shown embedded within the walls of pocket 15. This occurs because rim 10 is fabricated by molding it around bushing 20. Such integral fabrication assures that bushing 20 cannot become disengaged from hub 13, and that it is located properly astraddle plane of roation B. This is highly desirable for keeping wheel 1 balanced during operation, and for minimizing wobble often found in single bearing wheels. Of course, one having ordinary skill in the art will recognize that bushing 20 also could be press-fitted within pocket 15 after rim 10 is fabricated, with or without a recess 27 within pocket 15 for guidance in centering bushing 15, and still be within the spirit and scope of the present invention.

Concentric within inner race 25 and extending axially in both directions from plane B, thread guards 30 provide a unique feature of the present invention. Guards 30 comprise shank 31 having axle bore 35 adapted to receive the axle about which wheel 1 rotates. Shanks 31 of both guards 30 meet in the center of bushing 20 substantially at plane B (see FIG. 3). Shoulders 37 bear against inner race 25 to provide a stop against further impression of shanks 31 into pocket 15, thereby assuring a positive fit and keeping flanges 33 (discussed further below) aligned with rim 10. Ridges 41 borne on inner protrusion 39 (see FIG. 2c) bear against the inner diameter of race 25 to create a close, friction fit therewith. The inner diameter of axle bore 35 depends upon the application desired. By varying the inside diameter of bore 35, wheel 1 may be adapted to fit a variety of axles without replacement of bushing 20, thereby minimizing inventory requirements of suppliers of wheels 1.

On their distal extremities, shanks 31 bear concentric flanges 33 having outer margins 34 disposed adjacent outer perimeter 11 of wheel 1 when guards 20 are in place for operation. By so extending to cover hub 13, body 12 and to fit closely to rim 11, flanges 33 provide means for shielding dirt and moisture from bushing 20, as well as presenting an aesthetically pleasing appearance for wheel 1.

Wheel 1 may be fabricated from a variety of thermoset hydrocarbon materials adapted for geometric stability, strength and durability. A suitable material for wheel 1 is polyolefin, generally available. Tire 5 may be fabricated from the same material, or it may comprise a hard rubber or other durable hydrocarbon selected for resistance to wear and breaking, or for a cushioning effect preferred in some applications. For application as a caster for small vehicles, a suitable material for tire 5 is polyurethane, generally available. Thread Guard 30 preferably is made of a relatively rigid plastic such as nylon, also generally available. Bushing 20 may be one of a variety of enclosed bushing available on the market. For a bushing having precision bearings, a suitable choice is A-203-25, a bushing inventory identifier for said bushing available from Thaler International of Taiwan, Republic of China.

Contrast to the prior art is informative. Though prior art wheel 50 (FIG. 4) is substantially similar in size and dimensions to wheel 1, within hub 13 it differs significantly. Journaled within hub 13, two bushings 51 surround axle A, one each on either side of plane B. Bushings 51 typically would be pressed into pocket 15 rather than embedded when wheel 50 is molded. This impressment operation requires that measures be taken to assure that bushings 51 are aligned properly and pressed into hub 13 equidistant from plane of rotation B. Axle bore 53 extends the axial length of bushings 51 and beyond. Hubcaps 55 which mount onto the ends of bore 53 to shield bushings 51 from direct splattering of dirt and moisture. Being fabricated from substantially the same materials as wheel 1, wheel 50 is significantly heavier than wheel 1 because of the presence of the additional metal of second bushing 51 and metallic axle bore 53. Further, because two bushings are used instead of one, and because of the additional fabrication procedures, wheel 50 necessarily costs considerably more than wheel 1 unless bushings 51 are selected to be of lesser quality and precision.

In operation, wheel 1 is selected for size and tire 5 composition and mated with thread guard 30 having the appropriate diameter of axle bore 35 for the application. Guards 30 are installed by pressing their shank protrusions 39 into inner race 25 until shoulders 37 engage the edge of race 25 and margins 34 align with rim 10 as appropriate. Axle A is inserted within bore 35 and wheel 1 is mounted as required for the application.

The single bearing wheel herein described provides the benefits of simple fabrication, precision positioning and alignment of the axial bushing and wheel-cover style thread guards which both protect the bearing from moisture and dirt as well as create an aesthetically pleasing appearance. Further, the simplicity of the wheel lessens its costs through efficient fabrication, fewer parts and reduced inventory requirements. Finally, and perhaps most importantly, the concomitant cost reductions allow use of precision bearings in bushing 20 while still producing a caster wheel of competitive price.

While the invention has been particularly shown and described with reference to a preferred embodiment, it will be understood by those skilled in the art that various changes in form and detail may be made therein without departing from the spirit and scope of the invention.

I claim:

1. A single bearing wheel comprising
   a rim symmetric about a longitudinal plane of rotation and adapted to rotate about an axis normal to said plane of rotation, the rim having
   an outer circumference, an axial width and an inner hub concentric about said axis; and
   a tire concentric about the outer circumference;
   a single, precision bushing journaled within the hub and disposed symmetric about the plane of rotation;
   two guard means coupled to the hub and sandwiching the wheel.

2. The wheel according to claim 1 wherein each guard means comprises
   an elongated, axial shank defining a bore concentric with the axis, the shank having
   a proximate end journaled within an inner diameter of the bushing;
   a plurality of ridges parallel the axis and disposed on an outer diameter of the proximate end juxtaposed the inner diameter of the bushing; and
   a distal end extending away from the plane of rotation; and
   a flange disposed on the distal end of the shank and extending radially to a margin disposed adjacent the outer circumference of the wheel.

3. The wheel according to claim 1 wherein each guard means comprises
   an elongated, axial shank defining a bore concentric with the axis, the shank having
   a proximate end journaled within an inner diameter of the bushing; and
   a distal end extending away from the plane of rotation and beyond the axial width of the rim; and
   a concave-shaped flange disposed on the distal end of the shank and extending axially inward and radially outward from the axis to a margin disposed adjacent the outer circumference of the wheel.

4. The wheel according to claim 2 wherein the guard shank further comprises
   stop means disposed on the shank a selected distance from its proximate end for stopping the shank at a selected insertion distance into the bushing.

5. The wheel according to claim 4 wherein the stop means comprises
   a stop shoulder disposed on the outer perimeter of the shank and adapted to engage a face of the bushing.

6. The wheel according to claim 1 wherein the rim is molded from a thernoset plastic material.

7. The wheel according to claim 6 wherein
   the plastic material is a polyolefin.

8. The wheel according to claim 1 wherein
   the rim is molded with the bushing integrally journaled within the hub during molding of the rim such that the bushing cannot be disengaged from the hub after fabrication.

9. A single bearing wheel comprising
   a molded rim symmetric about a longitudinal plane of rotation and having
   an axial maximum width;
   an axis normal to said plane of rotation;
   an outer circumference and an inner hub having an inner radius and being concentric about said axis; and
   a tire concentric about the rim at its outer circumference;
   a single, precision bushing journaled within the hub and disposed astraddle the plane of rotation;
   two guards coupled to the hub and sandwiching the wheel, each guard having
   an elongated shank concentric the axis and having
   a proximate end journaled within the bushing; and
   a distal end extending away from the plane of rotation beyond the axial width of the rim;
   a plurality of ridges disposed on an outer diameter of the proximate end of the shank juxtaposed to an inner diameter of the bushing; and
   a stop shoulder disposed on the shank a selected distance from its proximate end; and
   a flange disposed on the distal end of the shank and extending axially inward and radially outward away from the axis to a margin disposed adjacent the outer circumference of the wheel.

10. An improved method of fabricating a caster for small vehicles, the method comprising provic a wheel having
a molded rim having a width symmetric about a longitudinal plane of rotation;
an axis normal to said plane of rotation;
an outer circumference and an inner hub having a single, precision bushing concentric the axis journaled permanently within the hub astraddle the plane of rotation and having an inner race diameter;
selecting an axle for mounting the wheel, the axle having a diameter; then
selecting a pair of thread guards, each thread guard having
an elongated shank with an axial bore adapted to receive and to match the diameter of the axle, the shank further having
a proximate end adapted to couple within the bushing and bearing radial ridges parallel the axis on its outer diameter;
a distal end extending away from the plane of rotation beyond the width of the rim; and
a stop shoulder adapted to engage a face of the bushing; and
a flange disposed on the distal end of the shank and extending radially to a margin disposed adjacent the outer circumference of the wheel; then
sandwiching the wheel with the thread guards by inserting the shank into the bushing, with the ridges in contact with the inner race diameter of the bushing, until the stop shoulder limits further insertion; then
journaling the axle within the bore; then
mounting the axle onto the vehicle.

11. The method of claim 10 wherein
the bushing is journaled within the hub during molding of the rim such that the bushing cannot be disengaged from the hub after fabrication.

12. An improved method of assembling a caster for small vehicles, the method comprising providing a wheels each having
a rim having an axial width symmetric about a longitudinal plane of rotation and further having
an axis normal to said plane of rotation;
an outer circumference and an inner hub concentric about said axis;
a tire concentric about the outer circumference; and
a single bushing molded within the hub and having an aperture concentric the axis;
providing a plurality of thread guards, each having
an elongated shank having a proximate end, a distal end extending axially beyond the width of the rim, a bore adapted to receive an axle and a stop shoulder disposed near the proximate end; and
a shield flange disposed on the distal end of the shank and extending axially inward toward the proximate end and radially outward from the shank to a margin; then
selecting an axle for mounting the wheel to a vehicle;
selecting a pair of thread guards having a bore sized for the selected axle;
sandwiching the wheel with the thread guards by inserting the proximate end of the shank into the bushing until the stop shoulder limits further insertion, whereby the shield flange margin is adjacent the outer circumference of the rim; then
journaling the axle within the axial bore; then
mounting the axle onto the vehicle.

13. The wheel according to claim 8 wherein
the inner hub has an inner radius;
an outer circumference of the bushing is disposed within a recess within the inner hub.

* * * * *